(12) United States Patent
Morimoto et al.

(10) Patent No.: US 11,529,867 B2
(45) Date of Patent: Dec. 20, 2022

(54) VEHICLE COOLING AIR INTRODUCTION STRUCTURE

(71) Applicant: TOYOTA JIDOSHA KABUSHIKI KAISHA, Aichi-ken (JP)

(72) Inventors: Masataka Morimoto, Toyota (JP); Susumu Kitajima, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 86 days.

(21) Appl. No.: 17/148,582

(22) Filed: Jan. 14, 2021

(65) Prior Publication Data

US 2021/0237555 A1 Aug. 5, 2021

(30) Foreign Application Priority Data

Feb. 4, 2020 (JP) .............................. JP2020-017423

(51) Int. Cl.
*B60K 11/08* (2006.01)
*F01P 1/00* (2006.01)
*F01P 11/10* (2006.01)

(52) U.S. Cl.
CPC ................ *B60K 11/08* (2013.01); *F01P 1/00* (2013.01); *F01P 11/10* (2013.01)

(58) Field of Classification Search
CPC ................................ B60K 11/08; F01P 11/10
See application file for complete search history.

(56) References Cited

U.S. PATENT DOCUMENTS

2012/0022742 A1\* 1/2012 Nemoto ............... B60K 11/085
701/36

FOREIGN PATENT DOCUMENTS

JP 2019104449 A 6/2019

\* cited by examiner

*Primary Examiner* — Kevin A Lathers
(74) *Attorney, Agent, or Firm* — Hauptman Ham, LLP

(57) ABSTRACT a vehicle cooling air introduction structure includes: an outer plate member that covers a front side, relative to a vehicle body, of a radiator; a cover member that is provided adjacent to an upper side, relative to the vehicle body, of the outer plate member and covers a front upper side, relative to the vehicle body, of the radiator; and an opening member that is moved in a rearward direction, relative to the vehicle body, by wind pressure during travel to thereby open an open portion at a lower end portion of the cover member.

5 Claims, 7 Drawing Sheets

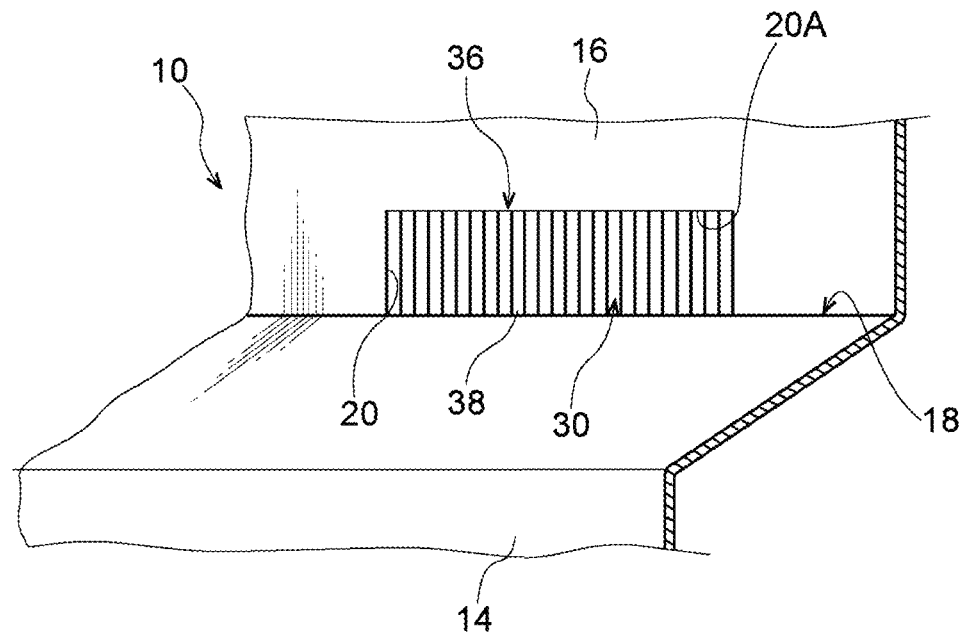
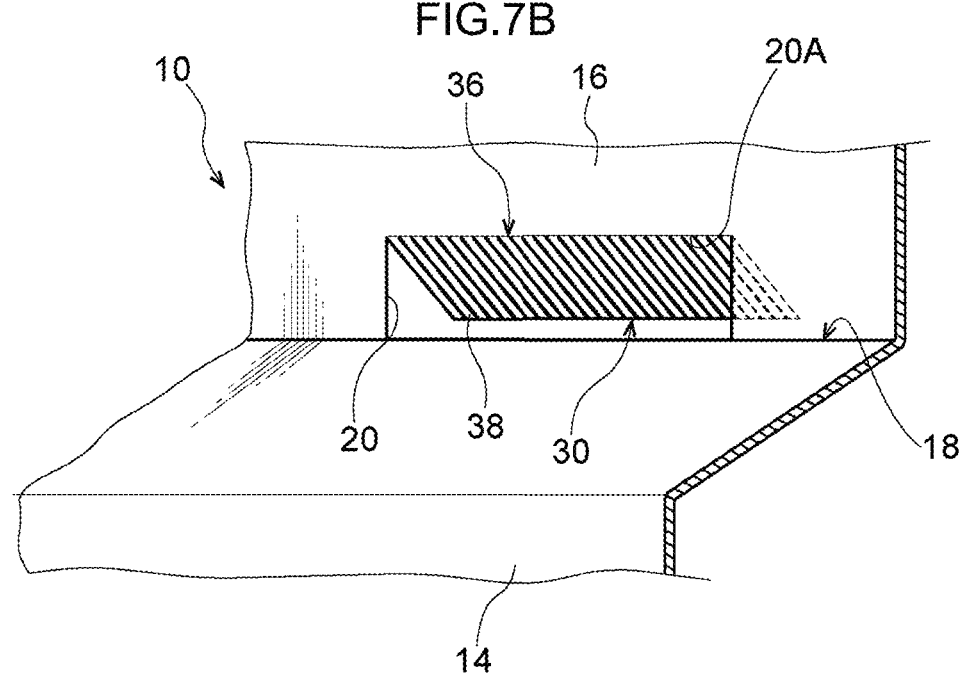

VEHICLE COOLING AIR INTRODUCTION STRUCTURE

CROSS-REFERENCE TO RELATED APPLICATION

This application is based on and claims priority under 35 USC 119 from Japanese Patent Application No. 2020-017423 filed on Feb. 4, 2020, the disclosure of which is incorporated by reference herein.

BACKGROUND

Technical Field

This disclosure relates to a vehicle cooling air introduction structure.

Related Art

There is known a vehicle grille shutter configured to guide cooling air to the upper portion of a radiator, thereby enhancing the ability to cool the upper portion, by changing the directions faced by two upper and lower fins that are attached to a grille shutter frame and that are pivotable about pivot shafts in a horizontal direction (e.g., see Japanese Patent Application Laid-open No. 2019-104449).

However, in the case of the above configuration, the grille shutter frame and the pivot shafts that pivotably support the two upper and lower fins become necessary, so space for installing them becomes necessary in the body and the number of parts increases.

SUMMARY

It is an object of this disclosure to efficiently supply cooling air while inhibiting an increase in the number of parts.

In order to achieve the object described above, a vehicle cooling air introduction structure includes: an outer plate member that covers a front side, relative to a vehicle body, of a radiator; a cover member that is provided adjacent to an upper side, relative to the vehicle body, of the outer plate member and covers a front upper side, relative to the vehicle body, of the radiator; and an opening member that is moved in a rearward direction, relative to the vehicle body, by wind pressure during travel to thereby open an open portion at a lower end portion of the cover member.

According to the vehicle cooling air introduction structure of the first aspect, the cover member that covers the front upper side, relative to the vehicle body, of the radiator is provided adjacent to the upper side, relative to the vehicle body, of the outer plate member that covers the front side, relative to the vehicle body, of the radiator. The open portion formed at the lower end portion of the cover member is opened by the opening member that is moved in the rearward direction, relative to the vehicle body, by wind pressure during travel. Consequently, cooling air is efficiently supplied to the radiator while inhibiting an increase in the number of parts. It will be noted that when the vehicle is stopped, the open portion is closed off by the opening member, so the visual appearance of the vehicle is not marred.

A second aspect is the opening member according to the first aspect, that is moved in a rearward direction, relative to the vehicle body, by wind pressure during travel to thereby open an open portion at a lower end portion of the cover member.

When the opening member moves back so as to close off the open portion, there is the potential for the lower end portion of the opening member to come into contact with the upper end portion of the outer plate member. However, according to the vehicle cooling air introduction structure of the second aspect, the opening member has a concavo-convex shape as seen in a plan view, so compared to a case where the opening member has a tabular shape, the area in which the lower end portion of the opening member comes into contact with the upper end portion of the outer plate member can be reduced. Thus, when the opening member moves back, the occurrence of noise caused by the lower end portion of the opening member coming into contact with the upper end portion of the outer plate member is inhibited.

A third aspect is the opening member according to the second aspect, wherein: the structure has a plurality of the open portions, and the concavo-convex shape of the opening member is different for each of the open portions.

If the concavo-convex shape of the opening members is all the same in the plural open portions, there is the potential for whistling noises at specific resonant frequencies to occur simultaneously and loudly when cooling air passes through the open portions. However, according to the vehicle cooling air introduction structure of the third aspect, the concavo-convex shape of the opening members is different for each of the open portions, so the resonant frequencies are different for each of the open portions. Thus, a situation where whistling noises occur simultaneously and loudly is avoided.

According to this disclosure, cooling air can be efficiently supplied while inhibiting an increase in the number of parts.

BRIEF DESCRIPTION OF THE DRAWINGS

FIG. 7A is a perspective view showing a state in which an opening member of an example modification in the cooling air introduction structure pertaining to the embodiment has closed an open portion; and FIG. 7B is a perspective view showing a state in which the opening member of the example modification in the cooling air introduction structure pertaining to the embodiment has closed the open portion.

DETAILED DESCRIPTION

Figure 1:
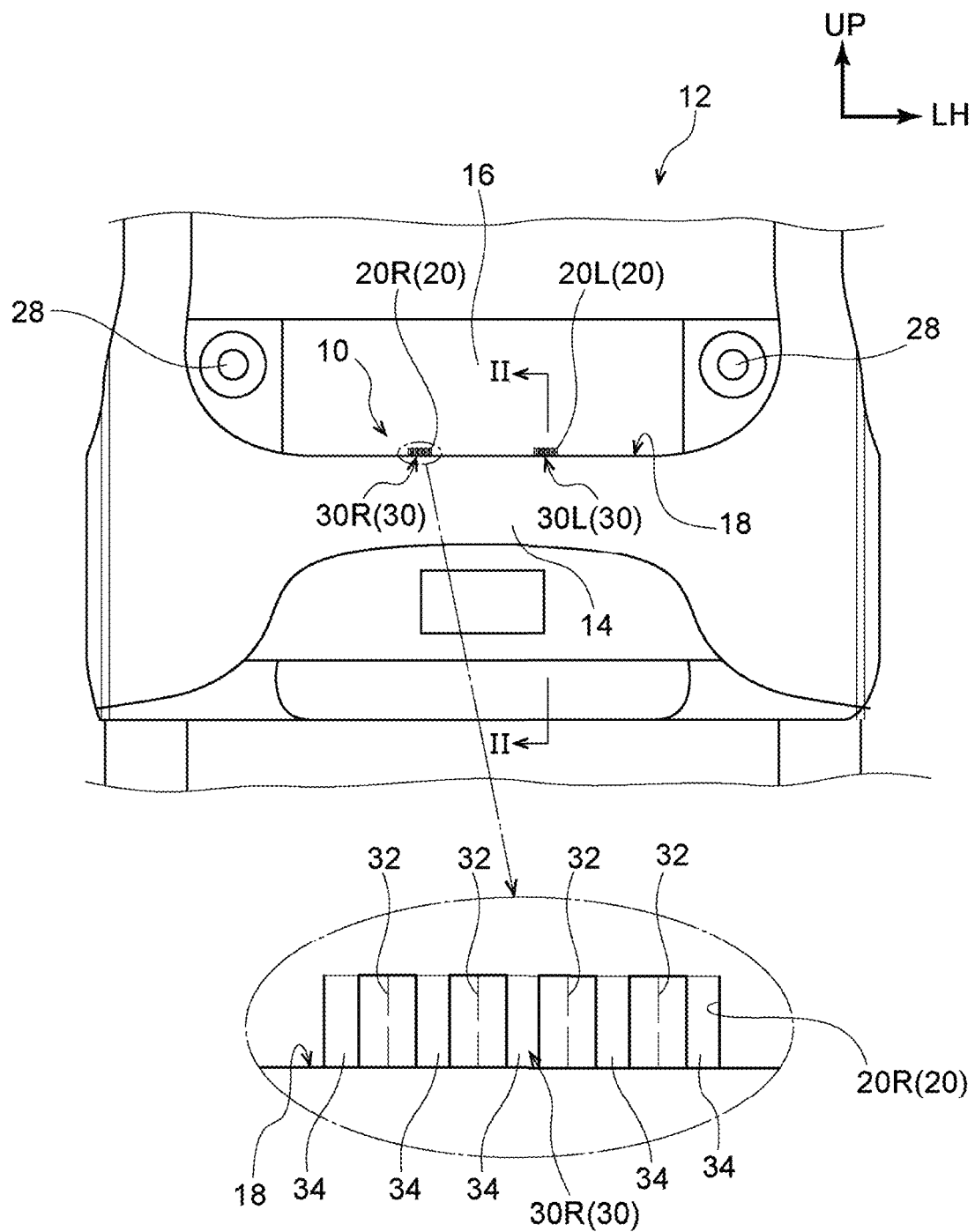
FIG. 1 is a front view showing a vehicle equipped with a cooling air introduction structure pertaining to an embodiment.

An embodiment pertaining to this disclosure will be described in detail below based on the drawings. It will be noted that a cooling air introduction structure 10 pertaining to the embodiment is applicable preferably to an electric vehicle serving as a vehicle. Therefore, in the embodiment, a self-driving bus (hereinafter called "the bus") 12 including a MaaS (Mobility as a Service) vehicle will be taken as an example and described as the electric vehicle (see FIG. 1).

For convenience of description, arrow UP appropriately shown in the drawings indicates the upward direction, relative to the vehicle body, of the bus 12, arrow FR indicates the forward direction, relative to the vehicle body, of the bus 12, and arrow LH indicates the leftward direction, relative to the vehicle body, of the bus 12. When the directions of upper/lower, front/rear, and right/left are used without further specification in the following description, these will be understood to mean upper/lower in the vehicle body up and down direction, front/rear in the vehicle body front and rear direction, and right/left in the vehicle body right and left direction (vehicle width direction).

Figure 2:
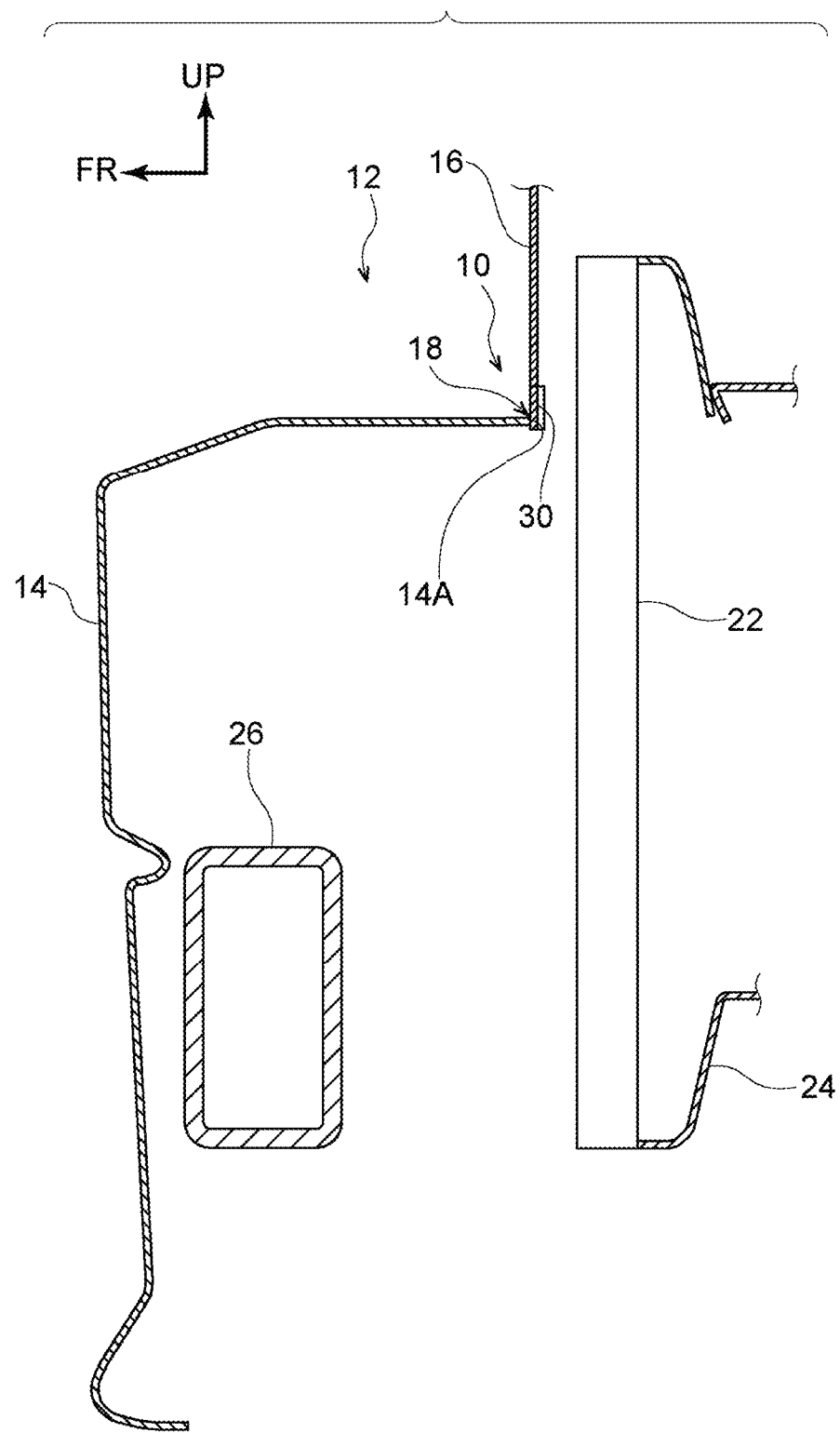
FIG. 2 is a sectional view looking in the direction of the arrows of line II-II in FIG. 1.

As shown in FIG. 1 and FIG. 2, the bus 12 has a front bumper 14, which serves as an outer plate member and covers the front side of a radiator 22, and a front grille 16, which serves as a cover member and covers the front upper side of the radiator 22. The front grille 16 is provided between a right and left pair of headlamps 28 and adjacent to the upper side of the front bumper 14.

It will be noted that the front bumper 14 projects forward beyond the front grille 16. Furthermore, below, the boundary portion between the front bumper 14 and the front grille 16 will be called a transition portion 18. As shown in FIG. 2, the radiator 22 is disposed on the front end portion of a fan shroud 24. A front bumper reinforcement 26 that extends in the vehicle width direction is disposed on the front side of the radiator 22 and on the rear side of the front bumper 14.

Figure 4A:
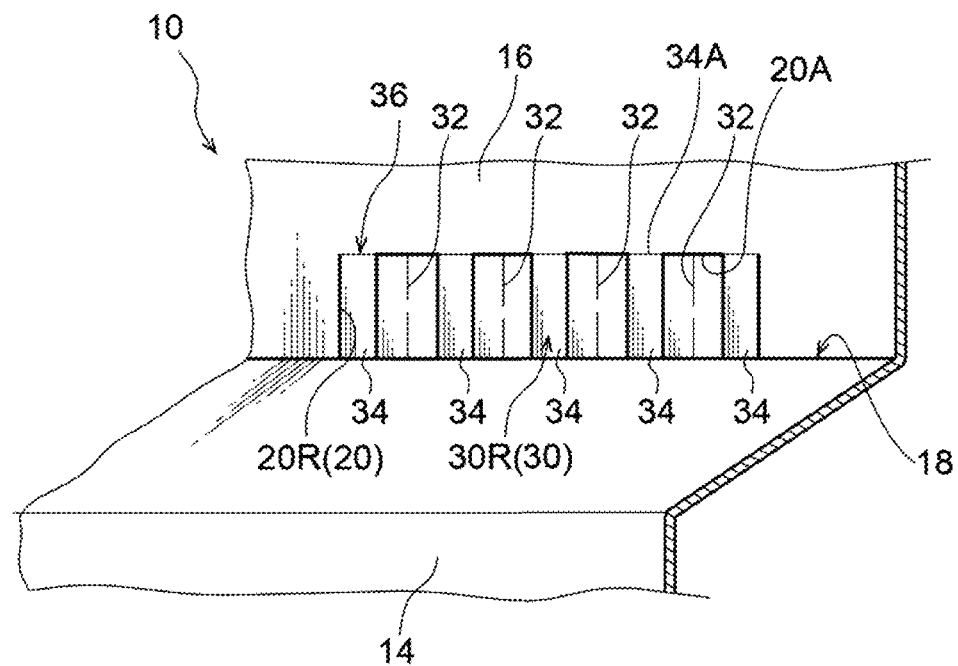
FIG. 4A is a perspective view showing a state in which an opening member on the right side in the cooling air introduction structure pertaining to the embodiment has closed an open portion.
Figure 4B:
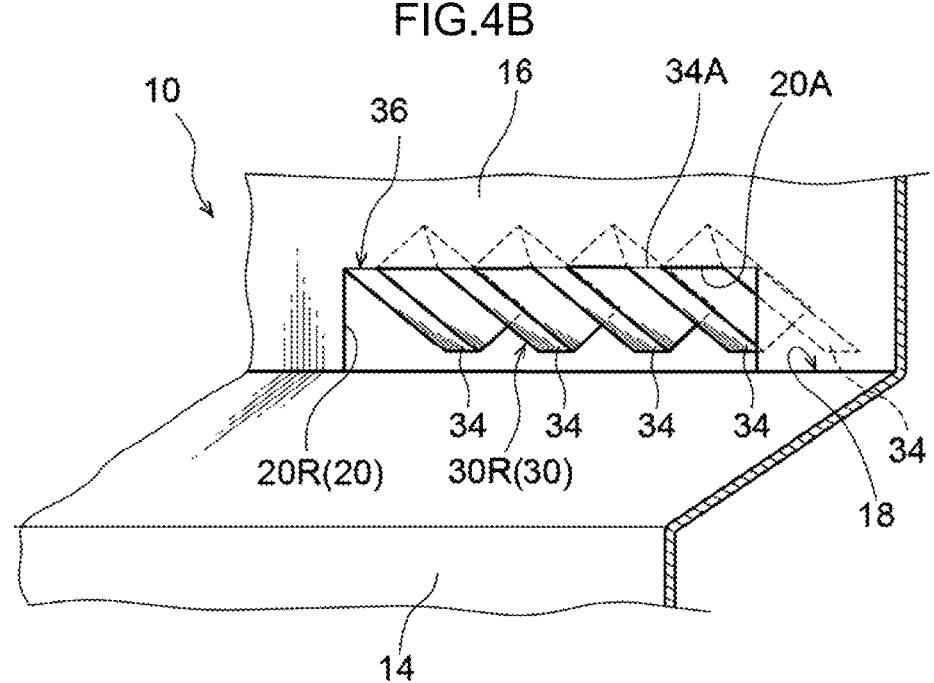
FIG. 4B is a perspective view showing a state in which the opening member on the right side in the cooling air introduction structure pertaining to the embodiment has opened the open portion.
Figure 5A:
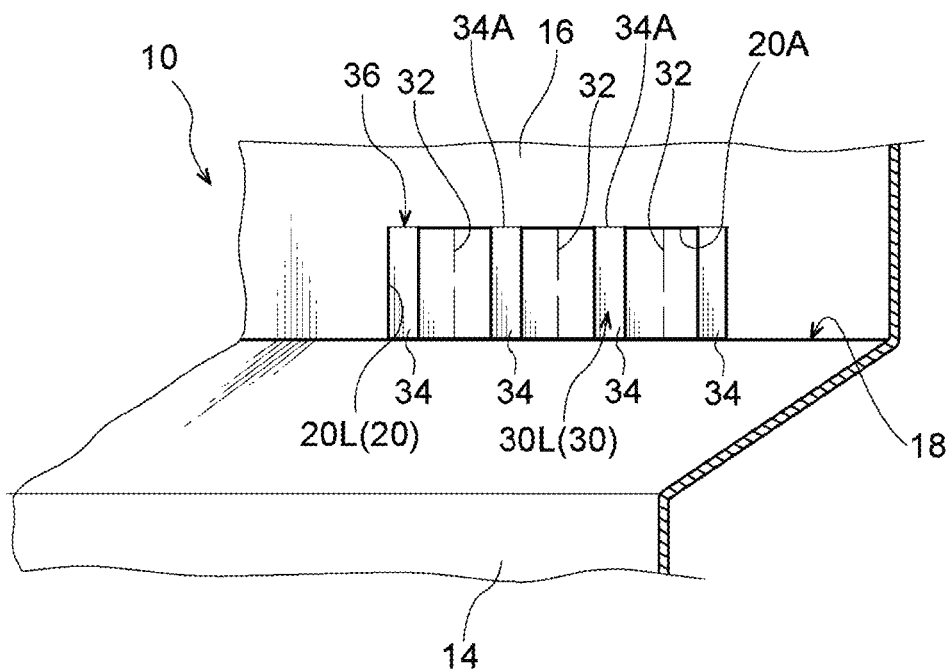
FIG. 5A is a perspective view showing a state in which an opening member on the left side in the cooling air introduction structure pertaining to the embodiment has closed an open portion.
Figure 5B:
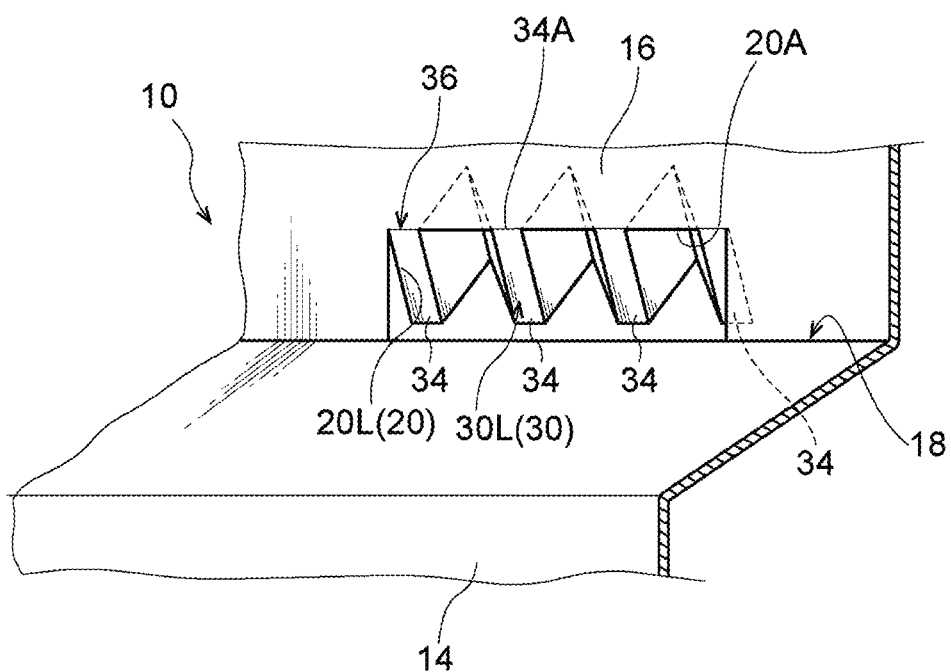
FIG. 5B is a perspective view showing a state in which the opening member on the left side in the cooling air introduction structure pertaining to the embodiment has opened the open portion.

As shown in FIG. 1, FIG. 4B, and FIG. 5B, at the lower end portion of the front grille 16 including the transition portion 18, plural (in the example shown in the drawings, two) open portions 20 are formed spaced apart from each other in the vehicle width direction. Each of the open portions 20 (open portions 20R and 20L) is formed substantially in the shape of a rectangle whose longitudinal direction coincides with the vehicle width direction as seen in a front view.

As shown in FIG. 4A, FIG. 4B, FIG. 5A, and FIG. 5B, on an upper edge portion 20A of each of the open portions 20, an opening member 30 is provided swingably and integrally with the front grille 16. So as to be capable of closing off the open portions 20, the length of the opening members 30 along the vehicle width direction is identical to the length of the open portions 20, and the height of the opening members 30 along the up and down direction is slightly greater than the height of the open portions 20.

Figure 6A:
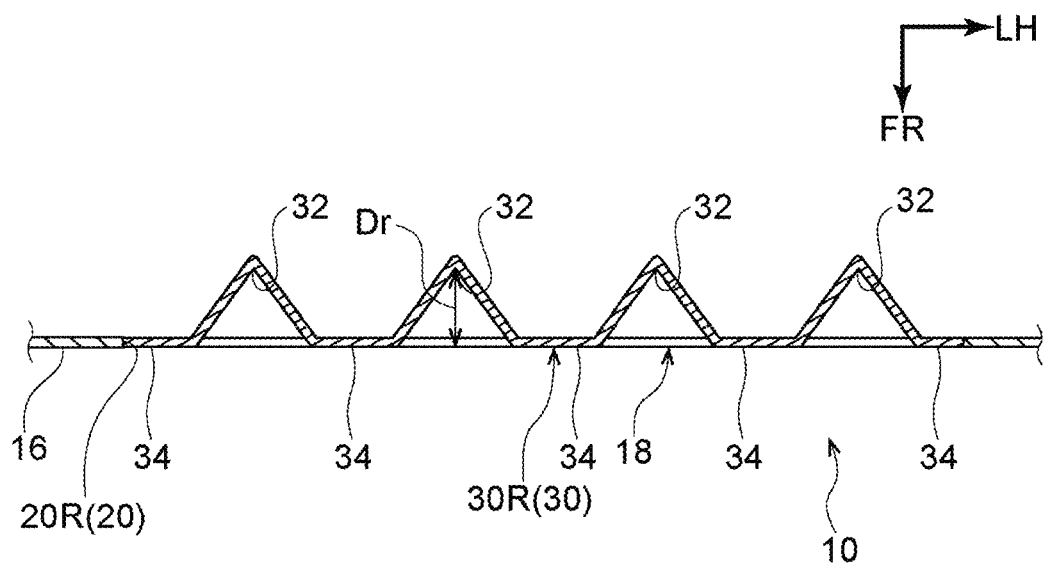
FIG. 6A is a plan view showing the opening member on the right side in the cooling air introduction structure pertaining to the embodiment.
Figure 6B:
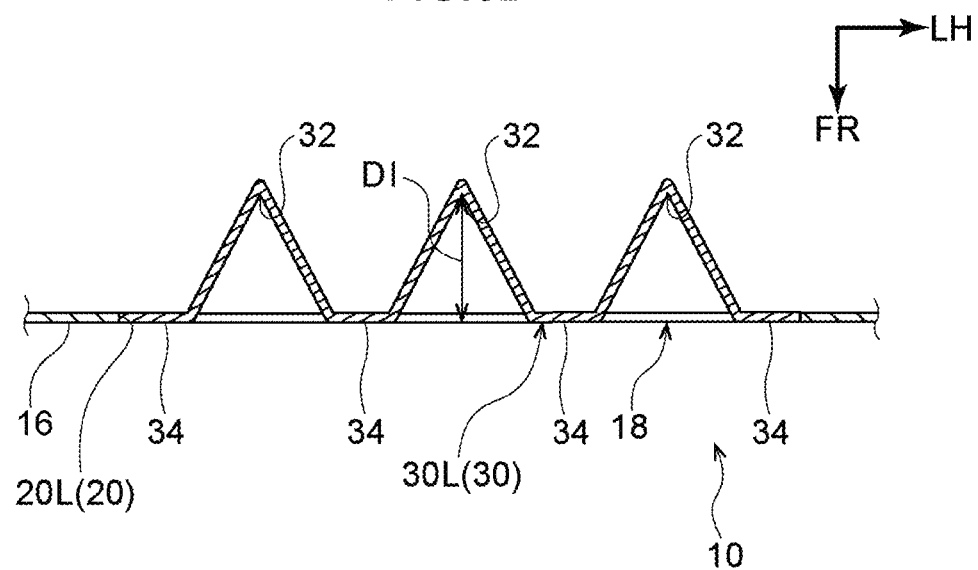
FIG. 6B is a plan view showing the opening member on the left side in the cooling air introduction structure pertaining to the embodiment.

As shown in FIG. 6A and FIG. 6B, each of the opening members 30 has a concavo-convex shape as seen in a plan view. The concavo-convex shapes of the opening members 30 are different for each of the open portions 20. Namely, the concavo-convex shapes of the opening members 30 are different between an opening member 30R provided in the open portion 20R on the right side and an opening member 30L provided in the open portion 20L on the left side.

Specifically, the opening member 30R on the right side shown in FIG. 4A, FIG. 4B, and FIG. 6A has four valley portions 32 that are recessed in acute angles rearward and has five mountain portions 34 that are tabular and that are flush with the front grille 16 as seen in a plan view. The opening member 30L on the left side shown in FIG. 5A, FIG. 5B, and FIG. 6B has three valley portions 32 that are recessed in acute angles rearward and four mountain portions 34 that are tabular and that are flush with the front grille 16 as seen in a plan view.

A depth Dl of the valley portions 32 of the opening member 30L on the left side is greater than a depth Dr of the valley portions 32 of the opening member 30R on the right side (Dl>Dr). Furthermore, as shown in FIG. 4A, FIG. 4B, FIG. 5A, and FIG. 5B, upper edge portions 34A of the mountain portions 34 are provided in a line that is continuous and integral with upper edge portions 20A of the open portions 20, and the plate thickness of the upper edge portions 34A is formed thinner than that of other portions of the opening members 30 to thereby configure hinge portions 36.

The hinge portions 36 allow the opening members 30 to be swingably supported on the upper edge portions 20A of the open portions 20 (the front grille 16). Namely, as shown in FIG. 4B and FIG. 5B, at least the lower end portions of the opening member 30 are movable rearward, using the hinge portions 36 as fulcrums, by wind pressure to which the opening members 30 are subjected when the bus 12 travels, and the open portions 20 are opened by this movement. When the open portions 20 are opened, cooling air is taken in from the front side to the rear side.

Figure 3:
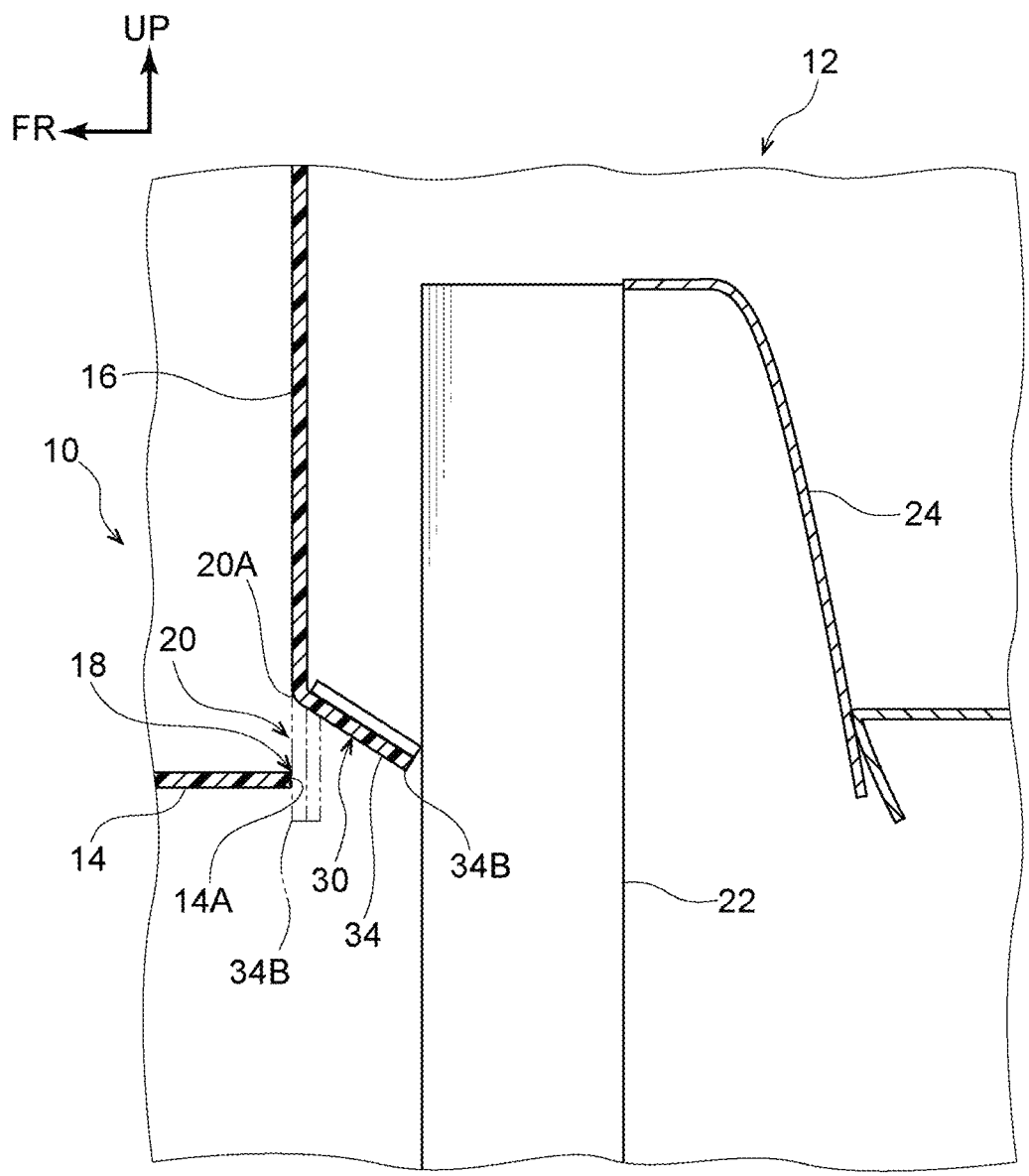
FIG. 3 is an enlarged sectional view showing part of FIG. 2.

It will be noted that, as shown in FIG. 3, when the opening members 30 move back so as to close off the open portions 20, such as when the bus 12 stops for example, lower end portions 34B of the mountain portions 34 come into contact with an inner surface (hereinafter called "the upper end inner surface") 14A of the upper end portion of the front bumper 14.

Next, the action of the cooling air introduction structure 10 will be described.

When the bus 12 is stopped, as shown in FIG. 1, FIG. 4A, FIG. 5A, FIG. 6A, and FIG. 6B, the open portions 20 including the transition portion 18 are closed off by the opening members 30. Consequently, the visual appearance (design) of the bus 12 is not marred. Particularly if the front grille 16 and the opening members 30 are black in color, the open portions 20 can be made even more inconspicuous.

When the bus 12 is traveling, as shown in FIG. 3, FIG. 4B, and FIG. 5B, the lower end portions of the opening members 30 are moved rearward by wind pressure in a state in which the opening members 30 are supported by the hinge portions 36. Because of this, at least the lower sides of the open portions 20 are opened so that needed cooling air is supplied directly and sufficiently to the upper portion of the radiator 22.

In other words, cooling air is efficiently taken into the radiator 22, and the ability to cool particularly the upper portion of the radiator 22 can be improved. Consequently, in a case where, for example, the upper portion of the radiator 22 is mainly used to cool an electric motor for traction, the range of the bus 12 can be improved. Furthermore, because the ability to cool the radiator 22 is improved, heating and cooling performance in the bus 12 can also be improved.

Furthermore, the opening members 30 are integrated with the front grille 16 (the upper edge portions 20A of the open portions 20) via the hinge portions 36, so hinges or the like for swingably attaching the opening members 30 to the front grille 16 (the upper edge portions 20A of the open portions 20) are unnecessary. Consequently, an increase in the number of parts can be inhibited (the number of parts does not need to be increased).

Furthermore, when the opening members 30 move back so as to close off the open portions 20, such as when the bus 12 stops for example, the lower end portions 34B of the mountain portions 34 come into contact with the upper end inner surface 14A of the front bumper 14 (see the long dashed double-short dashed lines in FIG. 3).

However, because the opening members 30 have concavo-convex shapes having the mountain portions 34, the area in which the opening members 30 come into contact with the upper end inner surface 14A of the front bumper 14 can be reduced compared to a case where the opening members 30 are entirely tabular. Consequently, when the opening members 30 move back, the occurrence of noise caused by the lower end portions 34B of the mountain portions 34 coming into contact with the upper end inner surface 14A of the front bumper 14 can be inhibited.

Furthermore, if the concavo-convex shapes of the opening members 30 are all the same in the open portions 20, the potential is high for whistling noises at specific resonant frequencies (natural frequencies) to occur simultaneously and loudly in a state in which the opening members 30 are being subjected to wind pressure (in a state in which cooling air is passing through the open portions 20). However, the concavo-convex shapes of the opening members 30 are different for each of the open portions 20, so the resonant frequencies (natural frequencies) are different for each of the open portions 20.

Consequently, a situation where whistling noises occur simultaneously and loudly can be avoided. It will be noted that even if whistling noises do end up occurring, noises with different frequencies are heard because the concavo-convex shapes of the opening members 30 are different. For that reason, annoyance that persons feel can be reduced compared to whistling noises that have a single tone (identical frequencies).

Next, example modifications of the opening members 30 will be described. As shown in FIG. 7A and FIG. 7B, the opening members 30 may also have shapes divided into plural members in the width direction. Namely, rather than the opening members 30 having concavo-convex shapes, the opening members 30 may also have plural divisional members 38 divided in the longitudinal direction of the open portions 20. The height of the divisional members 38 is, for example, slightly greater than the height of the open portions 20. The overall length of the plural divisional members 38 along the vehicle width direction is identical to the length of the open portions 20. With these opening members 30 also, when the bus 12 is stopped, as shown in FIG. 7A, the open portions 20 are closed off by the plural divisional members 38, so the visual appearance (design) of the bus 12 is not marred.

Furthermore, when the bus 12 is traveling, as shown in FIG. 7B, the lower end portions of the divisional members 38 are moved rearward by wind pressure in a state in which the plural divisional members 38 of the opening members 30 are supported by the hinge portions 36. Because of this, at least the lower sides of the open portions 20 are opened, and needed cooling air is efficiently supplied directly and sufficiently to the upper portion of the radiator 22.

Furthermore, even when the divisional members 38 move back so as to close off the open portions 20 and the lower end portions of the divisional members 38 come into contact with the upper end inner surface 14A of the front bumper 14, the area in which the divisional members 38 come into contact with the upper end inner surface 14A is small. For that reason, the occurrence of noise caused by the lower end portions coming into contact with the upper end inner surface 14A of the front bumper 14 can be inhibited even more.

Furthermore, although the divisional members 38 shown in the drawing are depicted in such a way that the lower end portions of the divisional members 38 all move with the same posture, in reality it is rare for the lower end portions of the divisional members 38 to all move with the same posture. Consequently, even when the opening members 30 having the divisional members 38 are provided in the right and left open portions (the open portions 20R and 20L) for example, their resonant frequencies (natural frequencies) are different, so a situation where whistling noises at specific resonant frequencies (natural frequencies) occur simultaneously and loudly can be avoided.

The cooling air introduction structure 10 of the embodiment has been described above based on the drawings, but the cooling air introduction structure 10 of this disclosure is not limited to the structure shown in the drawings and may be changed in design as appropriate without departing from the scope of this disclosure. For example, the concavo-convex shapes of the opening member 30R and the opening member 30L may also be bilaterally reversed.

Furthermore, the concavo-convex shapes of the opening members 30 are not limited to the shapes shown in the drawings so long as they are different for each of the open portions 20. Namely, the quantity and depth (angle) of the valley portions 32 and the width of the mountain portions 34 of the opening members 30 may be changed as appropriate for each of the open portions 20 in accordance with the size of the open portions 20 for example.

That said, the opening members 30 may also have the same concavo-convex shape for each of the open portions 20 so long as they are configured so that whistling noises do not occur simultaneously and loudly. Furthermore, just one open portion 20 may also be provided. Furthermore, the vehicle in this disclosure is not limited to an electric vehicle. The vehicle pertaining to this disclosure includes vehicles in general that use an electric motor for traction, such as hybrid vehicles and plug-in hybrid vehicles.

What is claimed is:

1. A vehicle cooling air introduction structure, comprising:
   an outer plate member that covers a front side, relative to a vehicle body, of a radiator;
   a cover member that is provided adjacent to an upper side, relative to the vehicle body, of the outer plate member and covers a front upper side, relative to the vehicle body, of the radiator; and
   an opening member that is moved in a rearward direction, relative to the vehicle body, by wind pressure during travel to thereby open an open portion at a lower end portion of the cover member, wherein
   the opening member has a concavo-convex shape as seen in a plan view, and
   the opening member comprises:

mountain portions that are tabular and that are flush with the cover member in a state in which the opening member has closed off the open portion, and valley portions that are positioned between the mountain portions and are recessed rearwardly.

2. The vehicle cooling air introduction structure according to claim 1, wherein:
the structure has a plurality of the open portions, and
the concavo-convex shape of the opening member is different for each of the open portions.

3. The vehicle cooling air introduction structure according to claim 1, wherein upper edge portions of the mountain portions are provided in a line that is continuous with an upper edge portion of the open portion.

4. The vehicle cooling air introduction structure according to claim 3, wherein the upper edge portions are thinner walled than portions of the opening member other than the upper edge portions.

5. The vehicle cooling air introduction structure according to claim 1, wherein the opening member includes plural divisional members divided in a longitudinal direction of the open portion.

\* \* \* \* \*